(12) United States Patent
Kohan et al.

(10) Patent No.: US 8,038,375 B2
(45) Date of Patent: Oct. 18, 2011

(54) EXPANSION ANCHOR

(75) Inventors: Philippe Kohan, Paris (FR); Michele Lucon, Cittadella (IT)

(73) Assignee: ITW Construction Products Italy S.R.L. Con Unico Socio, Padua (IT)

( * ) Notice: Subject to any disclaimer, the term of this patent is extended or adjusted under 35 U.S.C. 154(b) by 259 days.

(21) Appl. No.: 12/464,129

(22) Filed: May 12, 2009

(65) Prior Publication Data

US 2009/0285649 A1 Nov. 19, 2009

(30) Foreign Application Priority Data

May 14, 2008 (IT) .............................. TO2008A0359

(51) Int. Cl.
 *F16B 13/12* (2006.01)
(52) U.S. Cl. ..................... 411/80.5; 411/900; 411/908
(58) Field of Classification Search .................. 411/80.5, 411/34, 37, 38, 80.6, 900, 907, 908
See application file for complete search history.

(56) References Cited

U.S. PATENT DOCUMENTS

| | | | | |
|---|---|---|---|---|
| 983,451 | A * | 2/1911 | Kennedy | 411/80.5 |
| 3,489,312 | A * | 1/1970 | Hunckler et al. | 220/235 |
| 4,142,440 | A * | 3/1979 | Schefer | 411/42 |
| 4,518,291 | A * | 5/1985 | Lang et al. | 411/80.5 |
| 4,572,708 | A * | 2/1986 | Fischer | 411/22 |
| 4,752,168 | A * | 6/1988 | Richter | 411/38 |
| 4,984,946 | A * | 1/1991 | Phillips, II | 411/34 |
| 5,207,750 | A * | 5/1993 | Rapata | 411/38 |
| 5,246,322 | A * | 9/1993 | Salice | 411/15 |
| 6,416,267 | B1 * | 7/2002 | Nehl | 411/80.5 |
| 6,602,034 | B2 * | 8/2003 | Wakai et al. | 411/37 |
| 6,607,087 | B2 * | 8/2003 | Turnwald | 215/360 |
| 6,905,295 | B2 * | 6/2005 | Stevenson et al. | 411/34 |

* cited by examiner

*Primary Examiner* — Gary Estremsky
(74) *Attorney, Agent, or Firm* — Lowe Hauptman Ham & Berner LLP

(57) ABSTRACT

An expansion anchor comprising a tubular body, which extends along a longitudinal axis and is structured so as to have a head at one end, adapted to be engaged inside a hole obtained in a wall; the head comprising a deformable body made of a first plastic material having a predetermined mechanical rigidity, and at least one longitudinal rigid insert, which is firmly integrated in the deformable body and is made of a second plastic material having a higher mechanical rigidity than the mechanical rigidity of the plastic material of the deformable body itself.

14 Claims, 5 Drawing Sheets

EXPANSION ANCHOR

RELATED APPLICATIONS

The present application is based on, and claims priority from, Italian Application Number TO2008A 000359, filed May 14, 2008, the disclosure of which is hereby incorporated by reference herein in its entirety.

The present invention relates to an expansion anchor structured to fix a screw to a wall.

Specifically, the present invention relates to an expansion anchor, which is adapted to be engaged inside a hole obtainable in a wall and comprises a deformable tubular element in which a longitudinal through opening is obtained, capable of accommodating a fastening screw therein which is adapted in use to radially deform the anchor so as to increase the section thereof, so as to determine the locking of the anchor itself into the wall.

BACKGROUND OF THE INVENTION

As known, the expansion anchors of the above-described type are integrally made of a homogenous plastic material, which is characterized by a particularly low rigidity so as to ensure sufficient deformability and flexibility to the tubular element.

Although on one hand, the anchor having a plastic material characterized by a low rigidity ensures a good radial expansion and an effective plastic deformation capable of conveniently allowing a good anchoring of the anchor itself into walls made of compact materials and/or walls having internal voids, on the other hand such a mechanical feature may prevent a correct, strong coupling of the screw onto the tubular element of the anchor.

Indeed, it often occurs that the progressive screwing of the screw into the longitudinal through opening of the anchor instead of causing a correct helical incision, i.e. a correct self-threading of the screw onto the internal wall of the anchor opening, determines a surface abrasion on the internal wall itself, particularly stressed on the head portion, thus causing an increase and damage of the internal section of the opening itself.

Therefore, in this case, in addition to becoming progressively uncoupled from the anchor, the screw is no longer capable of correctly and completely retracting the head portion of the tubular element towards its collar, thus causing an incomplete, ineffective anchoring of the anchor into the wall.

Furthermore, such an inefficiency is particularly highlighted when the anchor is fixed onto walls made of materials with low compactness and/or having an internal structure presenting voids. Indeed, in these circumstances, the retraction caused by the screw on the head of the anchor determines a deformation of the anchor inside the wall which originates an oversized expanded plastic knotting along the longitudinal axis. Such an oversized expanded plastic knotting serves the function of exerting a tightening torque on the screw so as to anchor it to the wall. However, the low rigidity of the plastic material of which the anchor is made often determines a tightening torque by the plastic knotting on the screw, which may be insufficient to ensure a correct anchoring of the anchor to the wall.

Finally, in the expansion anchors made of a homogenous plastic material of the above-described type, the user can only partially perceive the complete, effective anchoring of the anchor to the wall.

SUMMARY OF THE INVENTION

Therefore, it is the object of the present invention to provide an expansion anchor which, in addition to having a higher tightening torque on the screw, is capable of ensuring, on one hand, a high radial deformability of the tubular element and an effective, strong self-threading of the screw inside the anchor itself at the same time.

According to the present invention, an anchor is implemented as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION OF THE INVENTION

Figure 1:
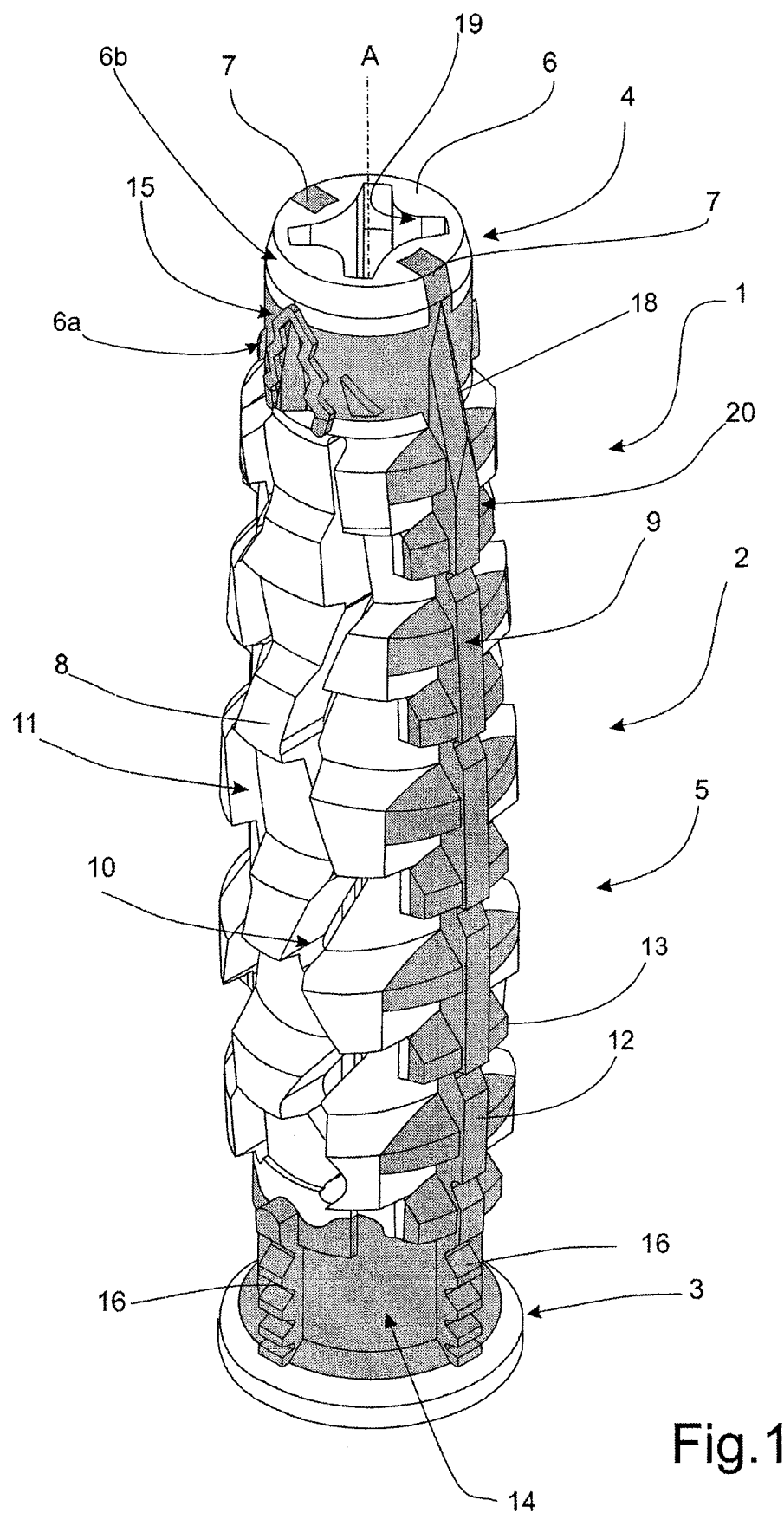
FIG. 1 shows a perspective view of an expansion anchor made according to the dictates of the present invention.
Figure 2:
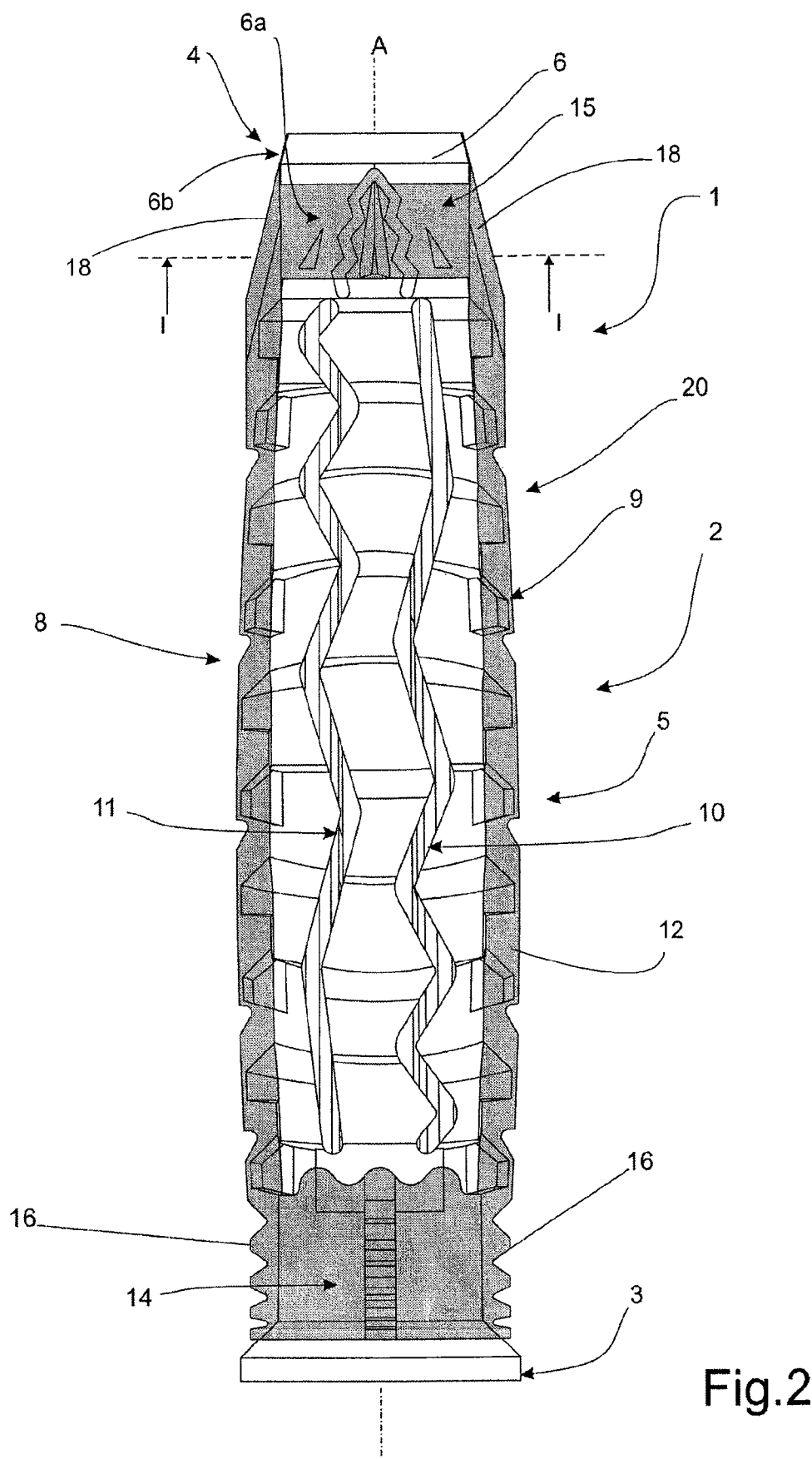
FIG. 2 is a first side view of the expansion anchor shown in FIG. 1.

With reference to the accompanying drawings, numeral 1 indicates as a whole an expansion anchor, which is adapted to be engaged inside a hole (not shown) obtained on a wall (not shown) with its longitudinal axis A being coaxial to the axis of the hole itself and structured to accommodate a screw adapted to expand and deform the anchor so as to anchor it to the wall.

Anchor 1 essentially comprises a tubular body 2 which extends along the longitudinal axis A and has a shaped collar 3 at one end, so as to be arranged in abutment against the wall; a shaped head 4 at an opposite end, so as to be able to be arranged in the innermost part of the wall hole; and a central section 5 arranged between collar 3 and head 4.

Collar 3 is coaxial to the axis A and comprises an annular flange, which is adapted in use to be arranged in abutment on the external surface of the wall so as to ensure the correct longitudinal positioning of anchor 1 inside the hole of the wall.

Instead, as regards the head 4, it comprises a deformable body 6 having a substantially cylindrical shape and made of a first plastic material having a predetermined mechanical rigidity; and at least one rigid insert 7, which is integrated in the deformable body 6 and is made of a second plastic material having a mechanical rigidity higher than the mechanical rigidity of the deformable body 6 itself.

More in detail, the first plastic material of which the deformable body 6 is made, has a mechanical rigidity characterized by a flexural modulus having a value higher than about 1500 Mega-Pascal and lower than 3000 Mega-Pascal; while the second plastic material of which the rigid insert 7 is made, has a mechanical rigidity characterized by a flexural modulus having a value higher than 3000 Mega-Pascal.

In the example shown in FIGS. 1, 3, 4 and 5, the deformable body 6 of head 4 of anchor 1 comprises two longitudinal rigid inserts 7, which are firmly integrated in the deformable body 6 preferably, but not necessarily in diametrically opposite positions.

The deformable body 6 of the head 4 has a substantially cylindrical portion 6a firmly fixed to the central section 5 and a substantially truncate-conical end portion 6b, while each longitudinal rigid insert 7 is defined by a rigid, substantially parallelepiped-shaped portion extending parallel to the axis A, preferably over the whole length of the deformable body 6, so as to at least partially cross portions 6a and 6b.

In the example shown in FIG. 1, each insert 7 comprises a rectangular tab which extends parallel to axis A, radially penetrates into the deformable body 6, and is embedded in the deformable body 6 itself so as to form a single body with the latter.

As regards the central section 5, it comprises a deformable, central cylindrical portion 8, which extends coaxial to axis A and is made of the first plastic material; and at least one pair of rigid, anti-rotation fins 9 which extend parallel to the axis A and are made of the second plastic material.

Specifically, the deformable, central cylindrical portion 8 has an external, substantially toothed surface and has at least one pair of through slots 10 and 11 which extend along a direction which is substantially parallel to the axis A according to a substantially zigzag profile, wherein a first slot 10 has a progressively increasing pitch from the collar 3 towards the head 4, while the second slot 11 has a pitch progressively decreasing from the collar 3 towards the head 4 itself.

Instead, as regards the rigid anti-rotation fins 9, they extend parallel to one another on a plane which is substantially orthogonal to the laying plane of the slots 10 and 11 over the whole length of the central cylindrical portion 8 and are shaped so as to have a substantially saw-tooth-shaped upper edge.

Figure 3:
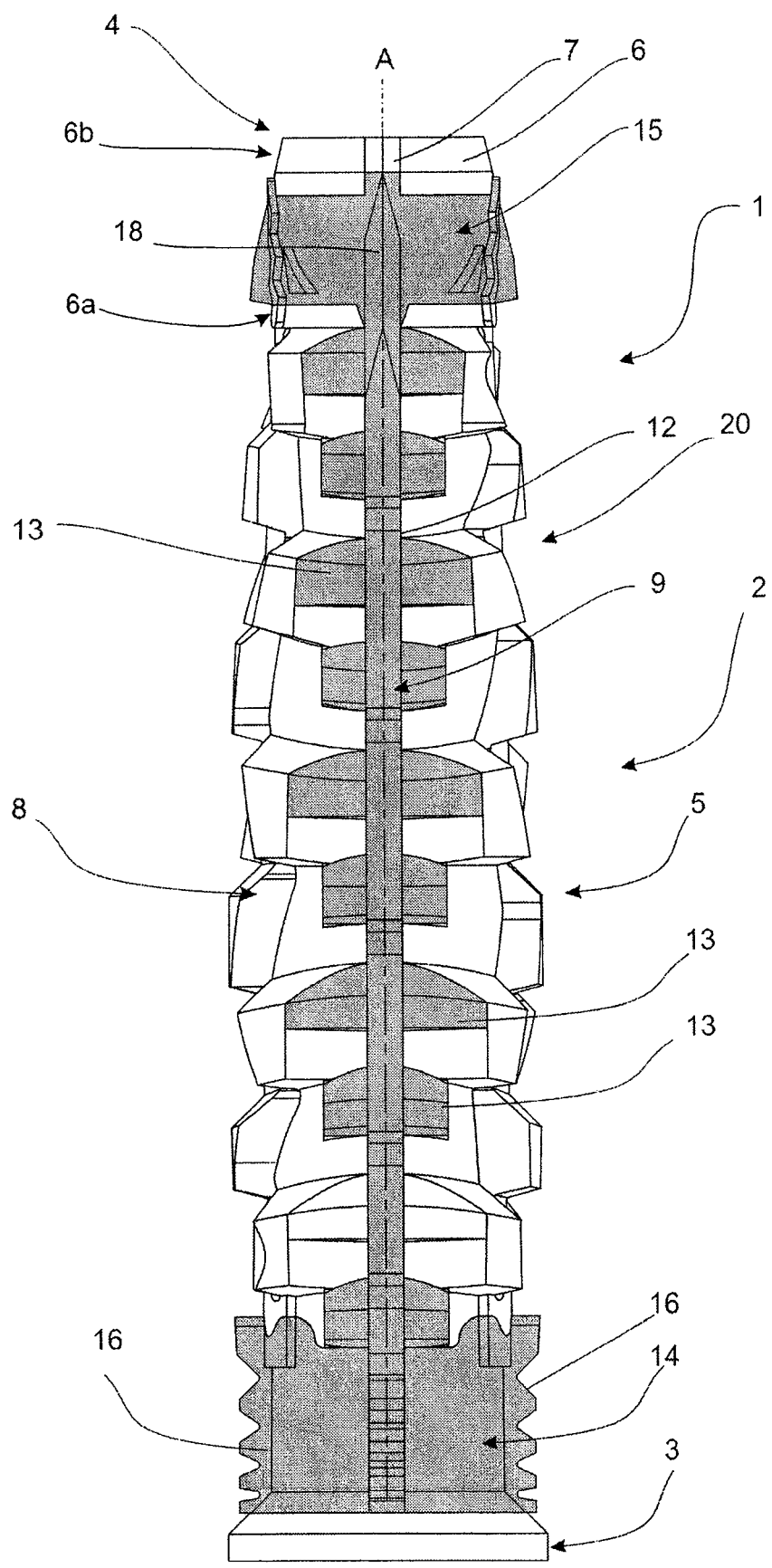
FIG. 3 is a second side view of the expansion anchor shown in FIG. 1.
Figure 4:
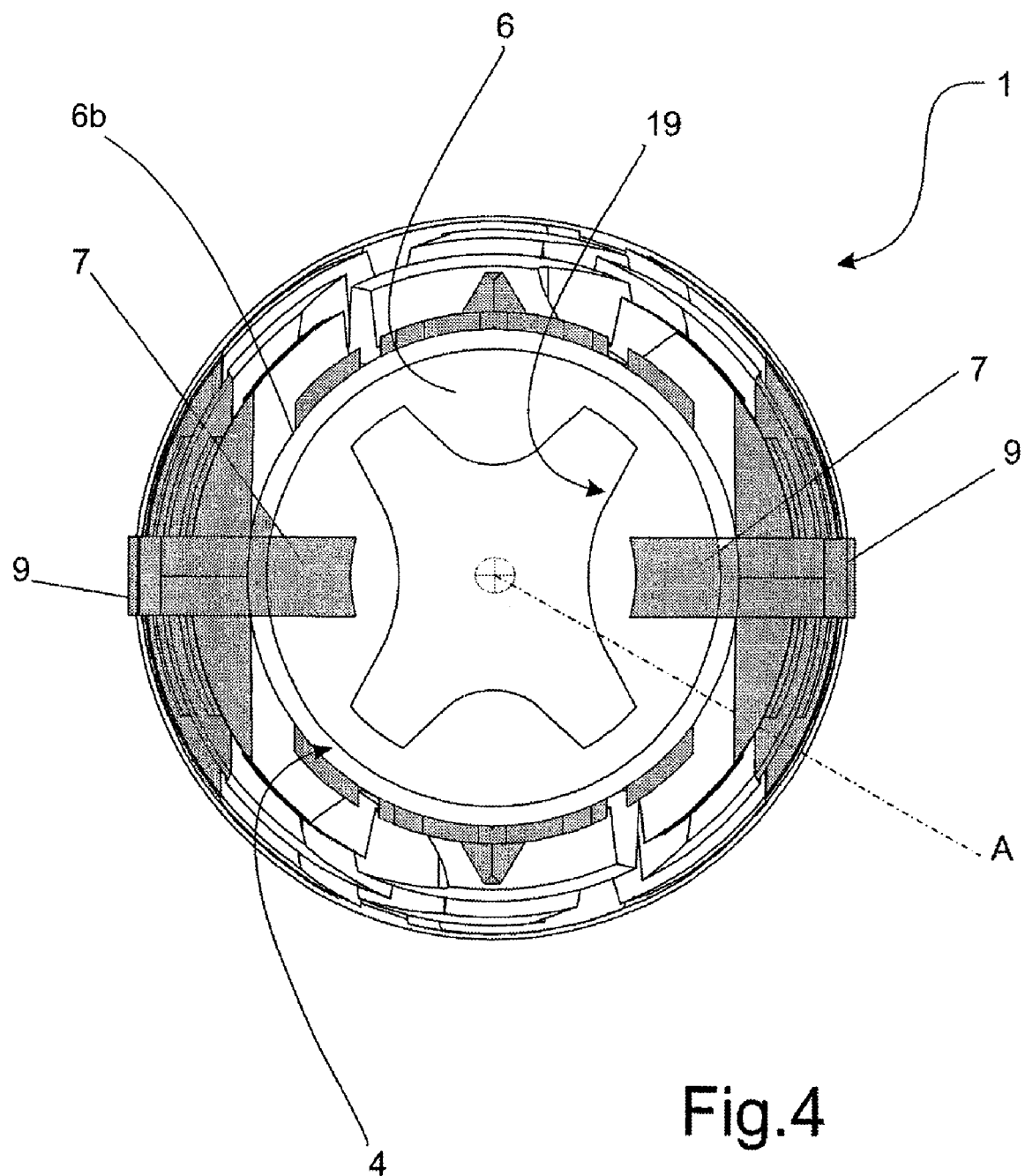
FIG. 4 shows a top view of the anchor shown in FIG. 1 on enlarged scale.
Figure 5:
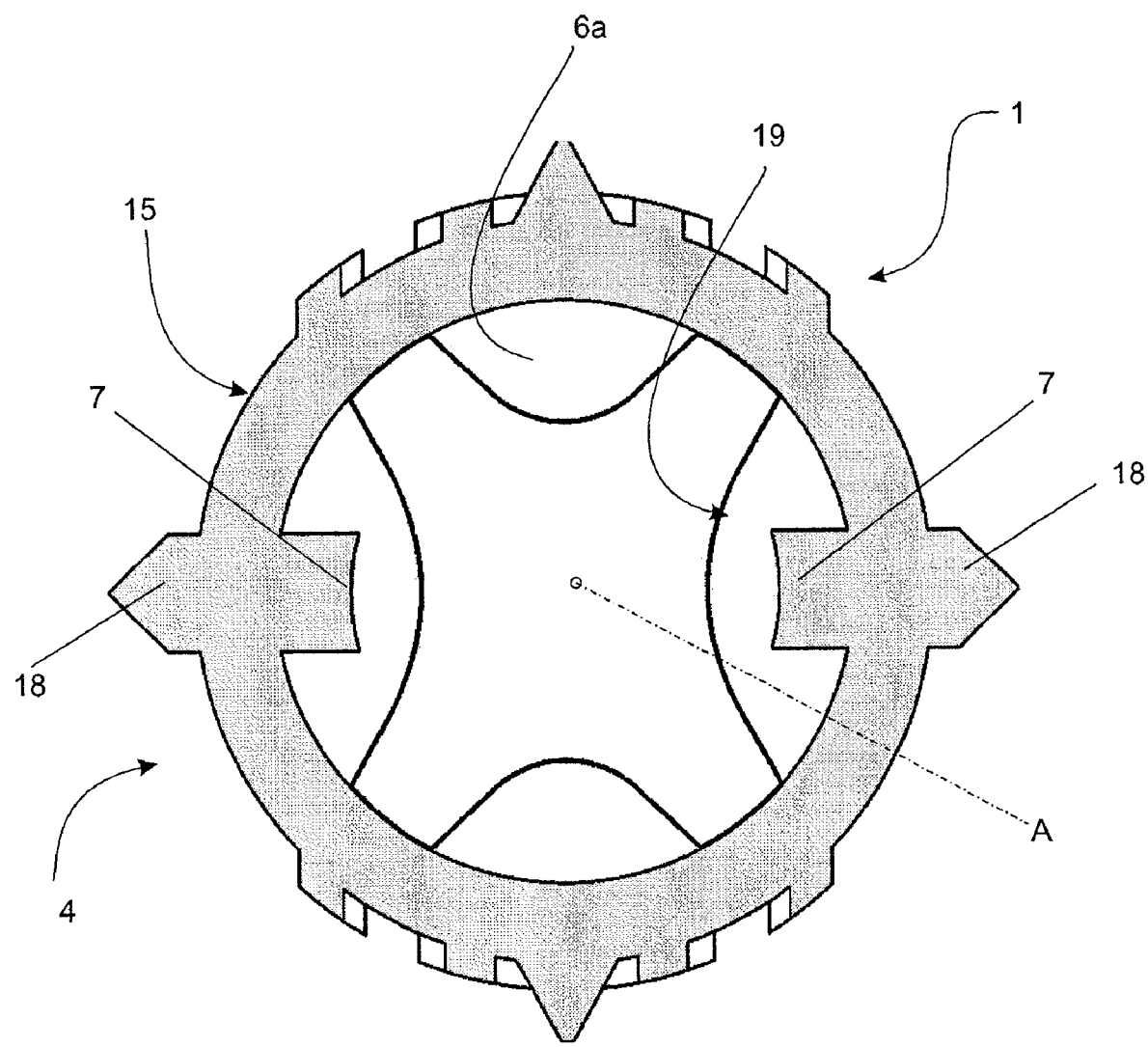
FIG. 5 shows the expansion anchor according to a longitudinal section I-I in FIG. 2 on an enlarged scale.

In the example shown in FIGS. 1 and 3, each rigid fin 9 is shaped so as to have a main ridge 12, which is parallel to axis A, which extends so as to protrude outwards from the face of the central cylindrical portion 8, and a series of transversal reinforcing segments 13, which are fixed to the face of the central cylindrical portion 8 and which extend orthogonal to the main ridge 12 being spaced from one another.

Anchor 1 further comprises two reinforcing rings 14 and 15 made of the second plastic material, in which a first reinforcing ring 14 coats one end of the central section 5 and is arranged in a position adjacent to the collar 3, while the second reinforcing ring 15 is also arranged coaxial to axis A and at least partially coats the head 4.

Specifically, the first reinforcing ring 14 comprises a cylindrical tubular portion having a preferably, but not necessarily smooth external surface, which extends between the ends of slots 10 and 11 and the collar 3, and four anti-rotation protrusions 16 arranged in pairs on two orthogonal planes, each having a substantially saw-tooth-shaped profile. In this case, two anti-rotation protrusions 16 are defined by a longitudinal extension of the anti-rotation fins 9 which is firmly fixed to the reinforcing ring 14.

Instead, as regards the second reinforcing ring 15, it comprises a cylindrical tubular portion, which is firmly fitted on the portion 6a of head 4 and has a preferably but not necessarily smooth external surface. More in detail, the second reinforcing ring 15 comprises at least one pair of anti-rotation protrusions 18 arranged parallel to the rigid fins 9, each of which is defined by a radial outward extension of a corresponding insert 7.

From the above description, it is worth specifying that the second reinforcing ring 15 which coats the head 4, is structured to conveniently control the deformation which is created on the anchor 1 under the bias of the screw being inserted and screwed, while the first reinforcing ring 14 serves the function of conveniently preventing the longitudinal opening caused by the extension of slots 10 or 11 towards the collar 3.

In other words, during the penetration of the screw into anchor 1, the first reinforcing ring 14 conveniently blocks the formation of longitudinal breaking lines between the slots 10 or 11 and the collar 3, as it is particularly rigid, while the second reinforcing ring 15 limits the radial deformation of the screw 4, and thus increases the screwing strength of the screw by originating a conveniently high tightening torque on the screw.

Furthermore, from the above description, it is worth specifying that the first 14 and second 15 reinforcing rings are connected to each other by means of the anti-rotation fins 9 and conveniently define a stiffening structure 20 of anchor 1 therewith.

In detail, the stiffening structure 20 of anchor 1 confers a relatively high rigidity to the anchor along the longitudinal axis A, which conveniently allows the user to push and/or drive the anchor 1 into the hole in the wall without causing any permanent deformation to the anchor 1 itself during the step of inserting, i.e. before screwing the screw therein.

A through opening 19 is also obtained in the body of anchor 1, which opening extends coaxial to the axis A in order to accommodate the shank of a fastening screw (not shown) and has a preferably but not necessarily cross-shaped transversal section with respect to axis A.

In use, when the fastening screw is screwed into the through opening 19 of the anchor 1, the end segment thereof internally cuts and progressively crosses the central section 5 to reach the inner part of head 4.

During this step, the central cylindrical portion 8 expands radially inside the hole under the bias of the screw and the rigid anti-rotation fins 9 are driven into the internal wall of the hole, thus preventing the rotation of anchor 1 about the longitudinal axis A.

Furthermore, during this step, because the screw is progressively screwed into the central cylindrical portion 8 made of the first plastic material, the user perceives a particularly low tightening torque.

Instead, when the thread of the screw cuts the deformable body 6 and the rigid inserts 7 of the head 4, the latter generates a tightening torque on the screw which is higher than the tightening torque exerted by the anchor during the previous step. The tightening torque increase on the screw is detected by the user which thus recognizes the condition of penetration of the screw thread into the head 4 of anchor 1.

By progressively cutting into the internal wall of the deformable body 6 and the rigid inserts 7 themselves, the thread of the screw starts retracting the head 4 towards the collar 3, thus completing the radial expansion of anchor 1.

Specifically, if the anchoring wall of anchor 1 has an internal structure having voids or gaps, the expansion/deformation of the anchor 1 inside the wall itself originates an expanded plastic knotting of the anchor 1 itself which is developed along the longitudinal axis A.

Specifically, the knotting of anchor 1 along the longitudinal axis A ends when the central body 5 is completely wound about the shank of the screw, and/or when anchor 1 completely rests on the inner faces of the wall gaps. During this step, the resting and compression exerted by the wall on the anchor 1 determines a contrast force thereon which conveniently opposes the retraction, caused by the screw, of head 4 from the hole present on the wall.

It is worth specifying that during this step, the presence of rigid inserts 7 on the head 4 determines the generation of a high tightening torque on the screw, which blocks the screwing of the same in the maximum tightening position, thus offering a highly efficient anchoring of the anchor which opposes the extraction from the hole.

It is worth specifying that the second reinforcing ring 15 determines a further increase of the tightening torque exerted by the anchor 1 on the screw.

Additionally, the presence of the first reinforcing ring 14 prevents the central body 5 under knotting and resting condition of the inner face of the wall from damaging the wall itself due to an excessively high compression, if the latter is made of light, not very compression-resistant materials, such as for example plasterboard walls.

The above-described anchor has many technical advantages.

Firstly, the rigid insert 7 on the deformable body 6 of the head 4 ensures a highly effective coupling of the screw on the anchor, while the deformability of the deformable body 6 of the head 4 itself conveniently allows to use different-type and diameter screws. Indeed, if on one hand the deformable body 6 promotes the engagement of screws with variously sized sections, by virtue of its low rigidity, on the other hand the rigid insert 7 ensures a more effective, strong coupling of the screw on the head 4 of the anchor, by virtue of its higher rigidity.

Specifically, the high rigidity of the plastic material of the inserts determines the formation of an internal thread when the screw self-threads on the anchor, which has a high resistance to stresses to which the head itself is subjected during the expansion and/or deformation/knotting steps of the anchor. Such a resistance indeed allows to tighten the screw, when completing the anchoring, with a higher tightening torque than that of the known anchors.

Additionally, the construction of anti-rotation fins 9 and anti-rotation protrusions 16 made of the second plastic material determines an increase of the contrast to anchor rotations, even when the holes are made in walls having void gaps and/or made of crumbly material, such as for example plasterboard walls.

Furthermore, the implementation of the first reinforcing ring made of the second plastic material prevents the formation of longitudinal facture lines which determine the breakage and surface deformation of the anchor and therefore the surface damaging of the wall.

Finally, by virtue of the zigzag profile of the slots, it is impossible for the screw itself to cross the slots when the user inserts the screw into the anchor in a position being not coaxial with axis A.

It is finally apparent that changes and variations may be made to the anchor described and illustrated herein without therefore departing from the scope of the present invention as defined in the accompanying claims.

The invention claimed is:

1. An expansion anchor, comprising
   a tubular body having a longitudinal axis; and
   a head at one end of the tubular body and adapted to be engaged inside a hole obtained in a wall;
   wherein said head comprises
      a deformable body made of a first plastic material having a predetermined mechanical rigidity, and
      at least one longitudinal rigid insert, which is firmly integrated in said deformable body and is made of a second plastic material having a higher mechanical rigidity than the mechanical rigidity of the first plastic material of the deformable body,
   wherein said deformable body comprises
      a first essentially cylindrical portion and a second essentially truncate-conical terminal portion, said at least one longitudinal rigid insert being defined by an essentially rectangular tab, which extends parallel to said axis so as to at least partially cross said first and second portions.

2. An anchor according to claim 1, wherein said head comprises two longitudinal rigid inserts, which are firmly integrated in the deformable body and at least partially penetrate said deformable body so as to extend inside along an essentially radial direction with respect to said axis.

3. An anchor according to claim 2, wherein said tab is embedded in said deformable body so that said rigid insert forms a single body with the deformable body.

4. An anchor according to claim 1, wherein said tubular body comprises
   a collar, and
   a deformable, central cylindrical portion, which extends coaxially to the axis between said head and said collar and is made of said first plastic material.

5. An anchor according to claim 4, wherein said tubular body comprises a first reinforcing ring, which is made of said second plastic material and is arranged between said deformable, central cylindrical portion and said collar.

6. An anchor according claim 5, wherein said tubular body further comprises a second reinforcing ring, which is made of said second plastic material and at least partially coats said deformable body.

7. An anchor according to claim 4, wherein said deformable, central cylindrical portion has an at least partially indented external surface.

8. An anchor according to claim 1, wherein said tubular body comprises at least one pair of rigid, anti-rotation fins which extend parallel to said longitudinal axis and are made of the second plastic material.

9. An anchor according to claim 1, wherein said first plastic material has a mechanical rigidity defined by a flexural modulus which is higher than approximately 1500 Mega-Pascal and lower than 3000 Mega-Pascal.

10. An anchor according to claim 1, wherein said second plastic material has a mechanical rigidity defined by a flexural modulus which is higher than 3000 Mega-Pascal.

11. An expansion anchor comprising:
    a tubular body having a longitudinal axis;
    a head, at one end of the tubular body, adapted to be engaged inside a hole obtained in a wall:
    wherein said head comprises
       a deformable body made of a first plastic material having a predetermined mechanical rigidity, and
       at least one longitudinal rigid insert, which is firmly integrated in said deformable body and is made of a second plastic material having a higher mechanical rigidity than the mechanical rigidity of the first plastic material of the deformable body,
    wherein said tubular body comprises
       a collar, and
       a deformable, central cylindrical portion, which extends coaxially to the axis between said head and said collar and is made of said first plastic material, and
    wherein said deformable, central cylindrical portion has at least one pair of longitudinal through slots which extend along a direction which is essentially parallel to said longitudinal axis according to an essentially zigzag profile.

12. An anchor according to claim 11, wherein said slots comprises a first slot and a second slot,
    said first slot has a first pitch progressively increasing from the collar towards the head, and
    said second slot has a pitch which progressively decreases from the collar towards the head.

13. An expansion anchor comprising
    a tubular body having a longitudinal axis; and
    a head at one end of the tubular body and adapted to be engaged inside a hole obtained in a wall:

wherein said head comprises
- a deformable body made of a first plastic material having a predetermined mechanical rigidity, and
- at least one longitudinal rigid insert, which is firmly integrated in said deformable body and is made of a second plastic material having a higher mechanical rigidity than the mechanical rigidity of the first plastic material of the deformable body, wherein said tubular body comprises
- a collar, and
- a deformable, central cylindrical portion, which extends coaxially to the axis between said head and said collar and is made of said first plastic material, and
- at least one pair of rigid, anti-rotation fins which extend parallel to said longitudinal axis and are made of the second plastic material, and
- wherein each said rigid fin includes
- a main ridge which is parallel to said longitudinal axis, and
- a series of transversal reinforcing segments, which are fixed to the external surface of said cylindrical portion and extend orthogonally to said main ridge.

14. An expansion anchor comprising
a tubular body having a longitudinal axis; and
a head at one end of the tubular body and adapted to be engaged inside a hole obtained in a wall:
wherein said head comprises
- a deformable body made of a first plastic material having a predetermined mechanical rigidity, and
- at least one longitudinal rigid insert, which is firmly integrated in said deformable body and is made of a second plastic material having a higher mechanical rigidity than the mechanical rigidity of the first plastic material of the deformable body, wherein said tubular body comprises
- a collar, and
- a deformable, central cylindrical portion, which extends coaxially to the axis (A) between said head and said collar and is made of said first plastic material,
- at least one pair of rigid, anti-rotation fins which extend parallel to said longitudinal axis and are made of the second plastic material,
- a first reinforcing ring, which is made of said second plastic material and is arranged between said deformable, central cylindrical portion and said collar, and
- a second reinforcing ring, which is made of said second plastic material and at least partially coats said deformable body, and
- wherein said rigid anti-rotation fins are firmly fixed to said first and second reinforcing rings.

\* \* \* \* \*